March 15, 1949. E. KLEIN ET AL 2,464,586
STEREOSCOPY
Filed Aug. 28, 1942 3 Sheets-Sheet 2

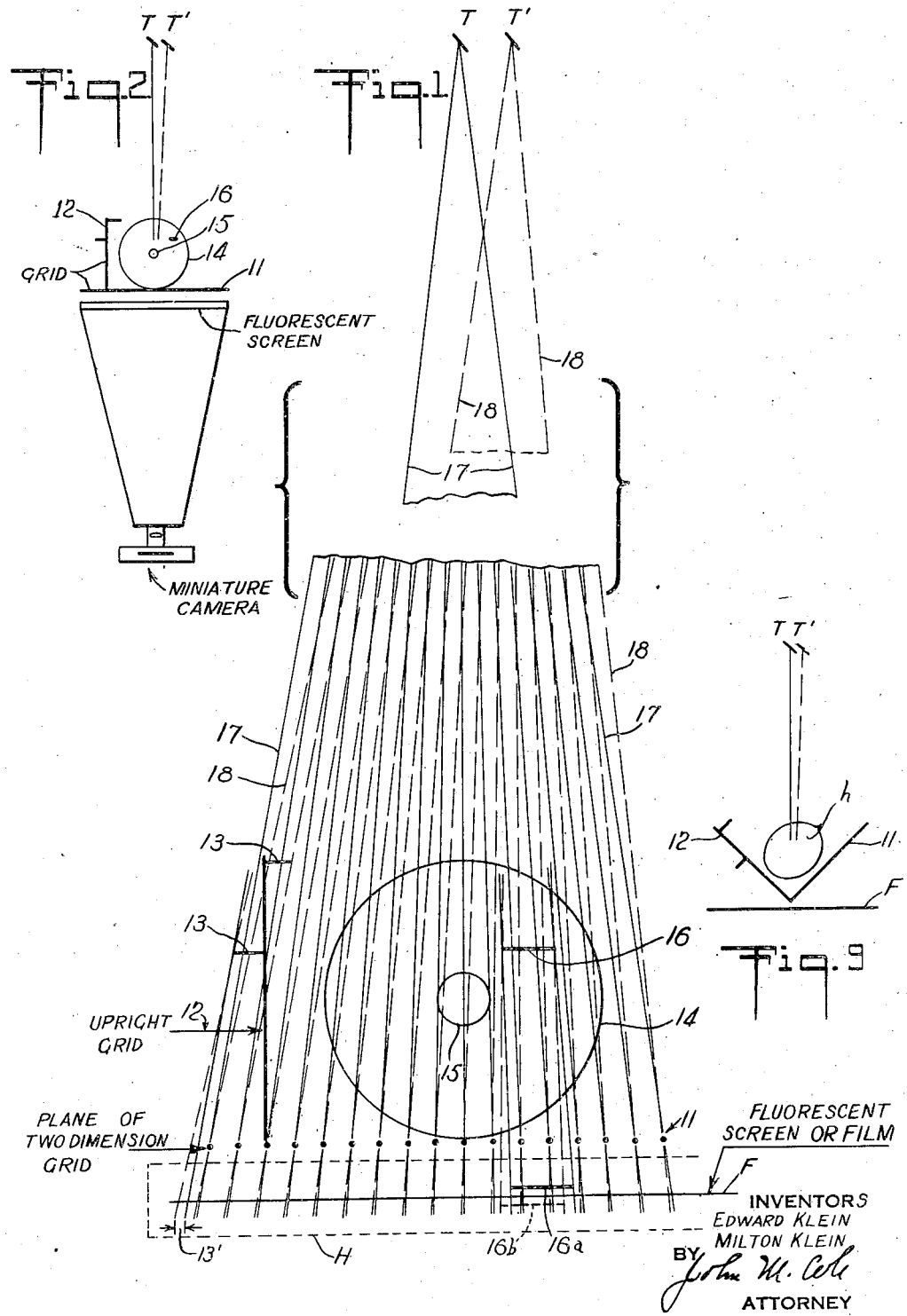

INVENTORS
EDWARD KLEIN
MILTON KLEIN
BY
ATTORNEY

March 15, 1949.　　　E. KLEIN ET AL　　　2,464,586
STEREOSCOPY
Filed Aug. 28, 1942　　　　　　　　　　　　3 Sheets-Sheet 3
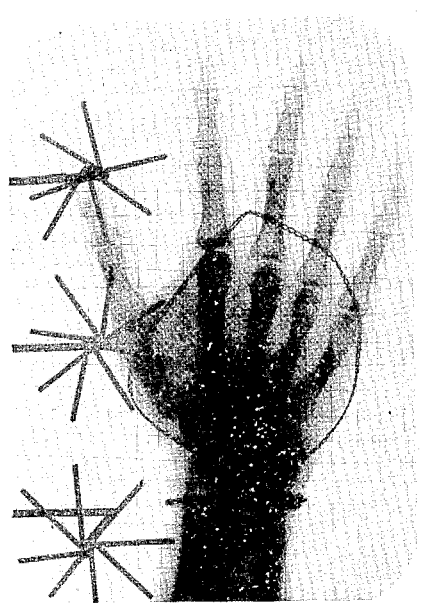
Fig.6.
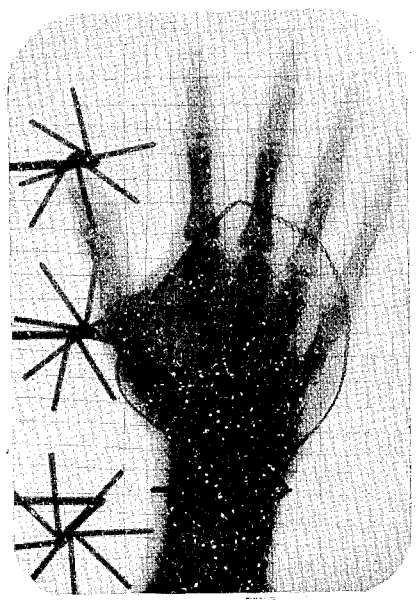
Fig.7.
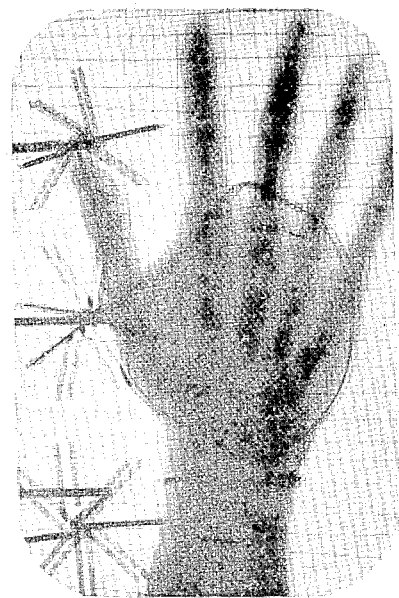
Fig.8.
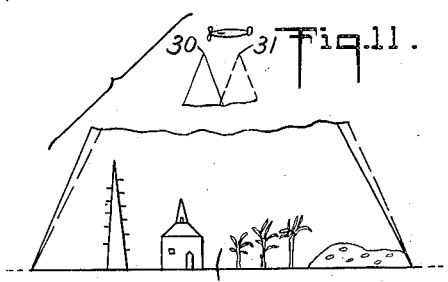
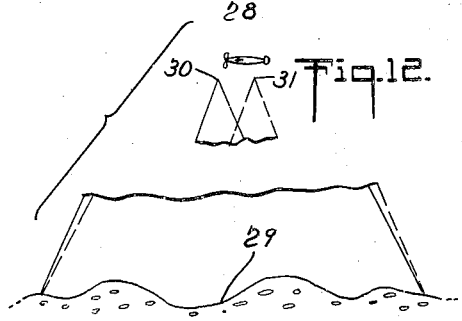
INVENTORS
EDWARD KLEIN
MILTON KLEIN
BY
ATTORNEY.

Patented Mar. 15, 1949

2,464,586

UNITED STATES PATENT OFFICE 2,464,586

STEREOSCOPY

Edward Klein, New York, and Milton Klein,
Woodmere, N. Y.

Application August 28, 1942, Serial No. 456,536

2 Claims. (Cl. 250—61)

1

The present invention relates to steroscopy.

The ordinary roentgenogram is a direct shadow picture obtained on X-ray photographic film of an object subjected to X-rays, or is a similar shadow photograph obtained by the aid of a fluorescent plate. The density of each component part of the shadow picture is dependent on the absorption of radiation by all the material through which the corresponding ray has passed. So far as the density of the image cast by the obstruction of a ray is concerned it makes no difference where the radiation obstructing material was disposed along the ray path. In all cases the relative positions of the images of the same subject matter on the fluorescent plates or the resulting pictures depend upon the position of the X-ray machine relative to the subject. A shift of either the machine or subject without change of target screen distance will, as is well known, result in a different roentgenogram.

Shortly after the early discoveries of Roentgen, methods were developed by which stereoptics in X-rays were made available. These X-ray stereoscopic pictures were made according to a technique very similar to that used in ordinary stereoscopic photography (according to which two cameras spaced the interocular distance were employed to photograph the same scene) and the two X-ray films resulting were viewed, for example, by reflecting mirrors to obtain a plastic view of the subject. More recent developments of the technique of so-called precision stereoscopes for X-ray films have called for much greater shift of the X-ray machine, employing very wide spacings depending upon the lengths of the ray paths in the mirror stereoscope to be employed.

Owing to the necessity of developing and drying the films and mounting them in the mirror stereoscope a considerable length of time is required before one can view the films stereoscopically. The apparatus necessary for obtaining these separate X-ray pictures was very large and expensive and it could only be used in locations where the viewing could be done and this viewing was limited to one person at a time. The impression made in the brain of the viewer was ephemeral. These methods have found favor where the condition is static over a period of time, as in pelvimetry, chest examination, or in X-ray examination of inanimate objects, and where highly trained, expert observers are available, but have been found wholly unsuited for work of nature where shortness of time is important, such as involved in fractures and many

2 surgical operations, or where the volume of work was great and personnel limited.

Other methods for location and three-dimensional mensuration in X-ray work have included the taking of several X-ray pictures of the subject from different known positions, and the use of various forms of graphic constructions, depth curves, parallel methods and the like, all of which were based upon the geometry involved in the varying positions of the X-ray projector, the subject and the film. These methods have the advantage of requiring more simplified apparatus, and of giving results of more readily demonstrated accuracy, but are tedious and complicated and have been unsuitable for obtaining quick, readily usable results whereby the accurate location of the foreign object could be obtained expeditiously.

In still another class of X-ray work, such, for example, as pelvimetry, flat grids or screens have been used so that a single X-ray picture could show the pelvis of the mother and head of the child, and one could obtain approximate measurements. Such screens or grids, however, were of no value in determining the location in space of the objects whose images appear in the X-ray picture.

In making aerial studies of terrain it is common to take airplane photographs at known elevations and spacings over an unknown terrain and from these photographs prepare prints, for example, by superimposing and polarizing the pictures, and they can be viewed as stereograms, so that the third dimensional effect is obtained thereby disclosing more completely the details of the terrain photographed. In this work there has heretofore been, so far as we are aware, no satisfactory method of obtaining measurements from these stereoscopic pictures to show the actual or relative elevations of various objects appearing in the pictures.

The present invention contemplates improvements in the art of stereoscopy by which the location in space of the component parts of a subject appearing in two photographic reproductions of tridimensional subject matter can be readily and accurately determined.

According to the present invention the equipment employed may be of the conventional form adapted for the type of work involved and its manipulation departs but little from common procedure. The photographic manipulations are similar to those employed in ordinary photography or X-ray photography, and the photographic technique (subsequent to the X-ray photograph)

may follow closely that used in ordinary stereoscopic photography.

In the X-ray field, instead of employing two roentgenograms of the subject only taken at different angles and then going through an elaborate manipulation—either of an optical or mathematical nature—the present invention contemplates working with superimposed stereographic reproductions of the subject preferably with a known reference object, such as a grid or gage.

In the field of ordinary photography, stereograms of an unknown subject are correlated with similarly taken stereograms of a known subject.

These stereographic reproductions may take various forms—for example—they may be superimposed projections of polarized stereoscopic pictures onto a non-depolarizing reflecting screen which give the appearance of depth when seen through cooperative polarizing viewers, or permanent superimposed polarized stereoscopic reproductions on an otherwise transparent medium and usable with similar viewers and transmitted light.

In diagnostic X-ray work the tridimensional grid is of less importance than in X-ray location and mensuration work, and can be dispensed with for such diagnostic work, but, as its presence does not sufficiently interfere with or complicate the usual routine, it may as well be used for the additional benefits which follow from its images being on the pictures.

An explanation of the various aspects of the invention will be made by reference to the accompanying drawings and other and further objects will be pointed out as the description proceeds.

In these drawings:

Figure 1 is a diagrammatic view illustrating the paths of rays from two projector positions relative to the subject, the reference object or grid, and the film or fluorescent screen;

Figure 2 is a diagrammatic view at a reduced scale illustrating an application of the invention in the employment of a miniature camera;

Figures 6 and 7 illustrate two roentgenograms of the same subject and reference object or grid taken from different projector positions;

Figure 8 illustrates the superimposing of the two prints of Figures 6 and 7;

Figure 9 is a diagrammatic illustration showing the subject and reference object or grid disposed in angular relation with respect to the screen or holder;

Figures 11 and 12 are diagrammatic views illustrating the taking of tridimensional aerial photographs.

Figure 3:
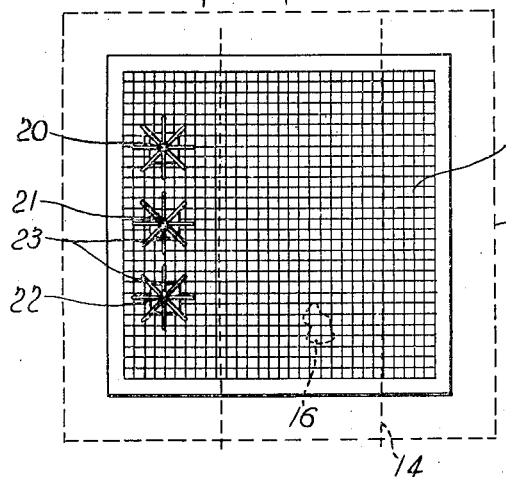
Figures 3, 4 and 5 are respectively a top plan view, a side elevational view and a perspective view of a reference object or grid.

In Figure 1 the X-ray film or fluorescent screen is at the level indicated at F and the target of the projector is indicated at T. Adjacent the holder H for the film, or for the fluorescent screen, is located a tridimensional grid or gage shown more in detail in Figures 3, 4 and 5. This grid or gage has a flat portion 11 shown in Figure 1 as being parallel with the film and close to it, and a portion 12 extending at right angles to the portion 11. The portion 12 has a number of horizontally extending elements such as spokes 13.

This grid is placed adjacent to the film holder or fluorescent screen usually in such a position that the subject is between the flat portion 11 of the grid and the projector. For purposes of illustration a thigh is illustrated at 14, a femur at 15 and an unknown object, such as a splinter, at 16. When the target is in the left position in Figure 1 the rays diverge slightly as shown in light full lines 17 and shadows are cast on the film or fluorescent screen as indicated by the intersections of the divergent light full lines with the horizontal line F. There will thus appear on the film or screen a shadow image not only of the subject and the unknown, but also a shadow image of the horizontal portion 11 of the grid and the vertical portion 12 of the grid.

The grid may consist of a network of X-ray opaque material such as indicated by the dots along the level of the line 11 in Figure 1, and each of these dots will cast a shadow at the proper position on the film. Furthermore the vertical part of the grid 12 and its horizontal members 13, 13 placed at various distances will cast corresponding shadows on the film. The position of these shadows will be obvious from the intersections of the full lines 17 indicating the rays on the line indicating the film.

Now, if the projector T is moved from the position indicated in full lines to the position T' indicated in dotted lines, the rays will travel in different paths, as indicated by the light dotted lines 18 in the drawing, and in each instance the shadows cast will be shifted in the direction opposite to the shift of the projector and in amounts depending upon the amount of projector shift and the distance from the film or fluorescent screen to the object which casts the shadow.

Inasmuch as the X-ray technique calls for film target distances such that the divergence of the rays over the area under investigation is negligible, the shift of shadow position with any standard set up of screen target distance will, within practical limits, be dependent solely upon the distance of the object casting the shadow from the film or fluorescent screen. The shift of shadow position is illustrated in the drawings by showing the left target position shadow of the object 16 above the line F where the reference character 16a is applied and by showing the shadow position corresponding to the right position of the target in dotted lines below the line F where the reference character 16b is applied. It will be noted that there is a substantial leftward shift of the shadow.

In the drawings the lower spoke 13 extending to the left is drawn at the same level as the object 16, and it will be noted that the space 13' between points where the full line and dotted line rays through the end of this spoke intersect the film is the same length as the offsetting of the images 16a and 16b.

The tridimensional grid or gage illustrated at 11, 12, 13 in Figure 1 may be constructed in various manners, it being desirable to have it include crossed elements in one plane and other elements extending at right angles to that plane, these other elements preferably having subordinate elements extending laterally from them in planes parallel to the first plane mentioned.

The crossed elements in the plane 11 of Figure 1 may conveniently be in the form of wires wound about a suitably rigid support or imbedded in this support, or may be lines of radio-opaque material carried on such a support. These crossed elements such as wires, lines and the like may preferably be placed a known distance apart convenient for measuring purposes, and may depend upon the class of work with which the particular grid is to be used.

Figure 4:
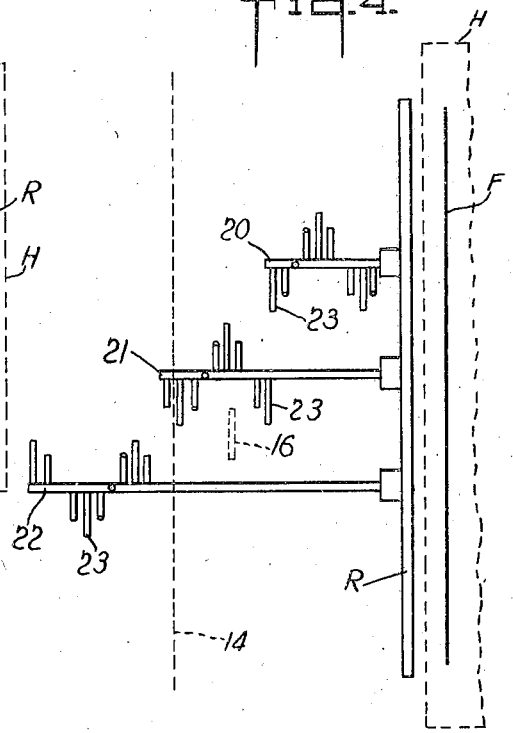
Figure 5:
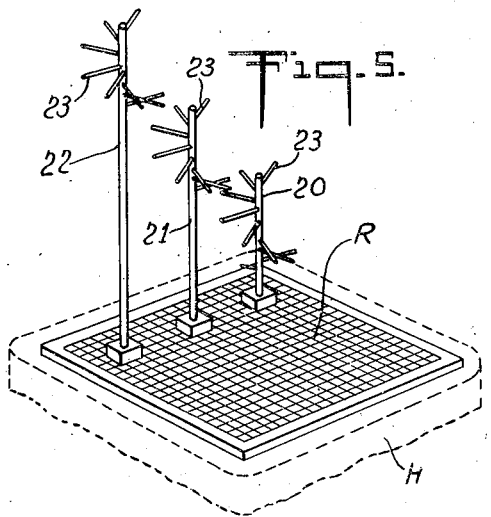

In Figures 3, 4 and 5 the reticulate portion of the grid is indicated by the letter R and the upright portion of the grid is shown in the form of three posts 20, 21, 22 opaque or transparent. Each of these posts carries a number of opaque spokes 23 extending away from the post generally parallel with the plane of the reticulate screen R. These post-like elements 23 may be permanently fixed to the body or frame which carries the reticulate screen, or may be detachably carried by it, or merely rest on it and be shiftable over its surface. The arrangement of a number of posts with the spokes has been found convenient, as it makes it possible to readily include in the finished roentgenogram elements having a very wide spacing from the plane of the film and yet have the shadows cast readily distinguishable. The invention is, however, in no way limited to this particular form of tridimensional grid, as an indefinite number of forms of grid are available to cast shadows on the X-ray film or fluorescent screen.

Figure 6 illustrates a roentgenogram or X-ray picture obtained from the right-hand palm down from one position such as the left target position shown in Figure 1, and Figure 7 is a similar roentgenogram obtained when the target position is shifted to the right as indicated in Figure 1. On the left of Figures 6 and 7 appear three black spider shaped objects which are the images cast by the posts 22 and spokes 23 shown in Figures 3, 4 and 5.

The technique employed in making each separate roentgenogram may be the same as that employed in standard procedure, except that the grid is included whenever it is desired to obtain stereographic roentgenograms from which depth determinations may be made. In other words the same projector, the same film holder, fluorescent plate, Buckey grid and other accessories may be employed as in usual practice, and the development of the film, whether full size or miniature, may follow regular procedure.

While the pictures of Figures 6 and 7 look at first impression to be alike, yet on close inspection it will be seen that the shadow positions of the parts are shifted from one view to the other. All the shadow positions in the right-hand figure, Figure 7, being to the left of the shadow positions of the corresponding parts in the left-hand figure, Figure 6.

In order to convert the two original roentgenograms into a form in which they can be superimposed and then stereoscopically examined, they are used to make contact prints on wash-off relief film. A convenient procedure to follow is to make a contact print of the right-hand picture on wash-off relief film with the shiny side up and to invert the left-hand X-ray picture and make a contact print on wash-off relief film with the shiny side up. These wash-off relief films are developed in the usual manner. One image is then a stereoscopically related mirror image of the other. The wash-off relief films are arranged with the emulsion sides facing one another and the films are then registered by using suitable registration marks, such as the frame formed by the opening in the lead cover, which appear on the original roentgenograms. They are then secured together, placed in printing solution in which the gelatin proportionally absorbs the printing solution. A sheet of transparent medium carrying light polarizing material on its opposite faces with the planes of polarization at right angles to one another is placed between the wash-off relief films and a print prepared in the usual manner, for example, in the process employed in making of "vectographs."

Such a print is photographed in Figure 8 of the drawings. To the ordinary observer it is a composite of the two original roentgenograms, but when it is viewed through a proper analyzer the left eye sees only one picture corresponding with Figure 6, while the right eye sees another picture corresponding with that of Figure 7. A perfect illusion of depth is therefore obtained. The grid now appears as having only one set of lines in each direction for the reticulate portion of the screen, and the three posts with the spokes now appear in their true tridimensional relation, also all the other objects in the roentgenograms give a combined single impression in the brain which is a third dimensional view of the entire subject as well as the known reference object or grid. The transparent polarized print may be viewed by transmitted light or may be projected and enlarged onto a glass screen where it may be viewed by the analyzers, with further magnification, if desired. In the example of Figures 6, 7 and 8 one can readily follow the chain and tell how it is passed about the hand and wrist. The amount of offsetting of the images can be measured by the right to left shift which they make in Figure 8. It will be seen that the images have greater and greater offsets or shifts the nearer they are to the projector. In all cases objects equally distant from the film when the exposures are made will have the offsets of the same magnitude in the direction opposite to projector shift.

In experimental work it has been discovered that roentgenograms taken in the manner outlined herein must be taken according to a different technique than that heretofore employed in connection with so-called stereoscopic X-ray work employing the precision or Wheatstone stereoscope. In that technique the X-ray machine is shifted either the interocular distance of 2½ inches or a much greater shift is employed, for example, up to 9 inches with usual film target distances. We have found that if one were to shift the target distances as indicated in the prior technique that the results obtained, as outlined herein, would not be suitable for the purpose. We have found that the maximum disparity of points on the full sized roentgenogram should be approximately one centimeter, for, if there is a disparity of points of more than approximately one centimeter, on a full sized object, the stereoscopic effect of the two pictures is only obtainable by highly trained expert observers who have developed their eye muscles to such an extent as to overcome the wide disparity. When, however, the disparity is of the order of one centimeter, the observation can be made by anyone with ordinary good vision with or without glasses and without noticeable eye strain.

As the film target distances are standardized at distances such as 30, 36, 72 inches, and these standardized distances bear a known relation to the maximum thickness of the body being X-rayed, it is possible to directly determine what the projector shift should be for each screen-target distance, for example, with a target distance of 30", thickness of the object 10", and a disparity of ⅜", the projector shift should be ¾".

When the roentgenographic process does not involve the use of the fluorescent screen the sensitized film is at F, Figure 1. When, however, the fluorescent screen is to be used, the usual photographic processes are employed. A typical set up for miniature camera is shown in Figure 2.

Where the investigation being made is one which requires locating the subject into a plane oblique with respect to the film or fluorescent plate the grid is similarly located. This is illustrated in Figure 9 where the head $h$ is oblique to the film F. Then measurements may be made with respect to known points of reference in the subject.

Figure 10:
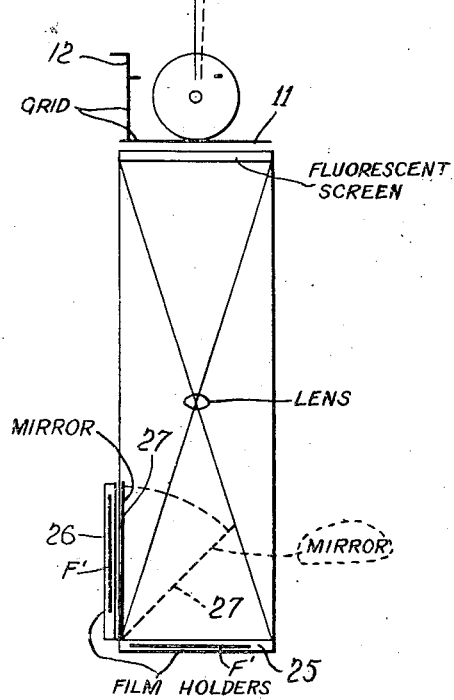
Figure 10 is a diagrammatic view illustrating an arrangement for obtaining stereoscopic pictures on wash-off relief film.

Inasmuch as the process of producing the polarizing print involves the use of mirror images on wash-off relief film it is possible to take the roentgenograms directly onto the wash-off relief film. A set up for this is indicated diagrammatically in Figure 10. Two film holders 25 and 26 are employed, each adapted to hold a wash-off relief film F" with the film base toward the lens. The film in holder 25 is being exposed with target in one position and the mirror 27 in the full line position. The film in holder 26 is then exposed with the target in the other position and the mirror in the dotted line position. This method is adaptable for very speedy operation as it is possible to work with warm solutions and it is unnecessary to dry the negatives. This process is more fully discussed in the application of Edward Klein, Serial No. 456,537, filed concurrently herewith.

Where stereo-roentgenograms are desired for diagnostic purposes, and depth measurements are not essential, the entire grid may be dispensed with, all the other procedure, however, being followed. Then the roentgenograms may be viewed and the third dimension illusion produced in a manner much more easily studied than with the so-called precision stereoscope. As the presence of the grid does not interfere in any way with the entire procedure there is no need of dispensing with it and its accompanying advantages.

In any set up where the work is repeated on different subjects the shadows cast by the upright portion of the grid will always be the same, and hence it is possible to X-ray the subject with or without the horizontal portion of the grid and employ with the stereo-roentgenogram of the subject a similar stereo-roentgenogram of the upright part of the grid made at some other time. This element may be moved laterally across the field of view and the same depth preceptions obtained as though the images were on the same roentgenogram. The same effect would be obtained if one were to simply remove from the finished stereo-roentgenogram the portion carrying the images of one of the spoked posts and physically slide this portion of the roentgenogram about on the remainder of the roentgenogram keeping it properly oriented, and in this way the proper spoke of the mobile grid could be apparently brought directly into contact with the unknown object being investigated, thereby affording a direct measurement of the elevation of the object. To facilitate spoke identification each may carry some appropriate indication such as a number or letter.

The diagrammatic view of Figure 11 illustrates a terrain 28 of known objects occupying an area equivalent to the field of the camera at the elevation of the airplane, for example, trees, buildings, a high chimney, a wireless tower, a hill or a mountain, the objects having known elevations. Two camera positions 30 and 31 are indicated, these positions being far enough apart in space and at the proper elevation so that the pictures taken may be formed into a stereogram, and when such a stereogram is produced by any of the processes above referred to it can be viewed in the proper manner to obtain the complete tridimensional effect. These form comparison pictures for future reference when studying unknown terrain.

Figure 12 is a view similar to Figure 11 showing the camera positions 30 and 31 showing the same elevation and spacing as in Figure 11 and illustrating an unknown terrain 29 in the field of the camera. The pictures of the unknown terrain are taken from the same elevation as when taking the pictures of the known terrain. The pictures formed as in Figure 12 would be the same as the stereoscopic pictures heretofore employed, but when the pictures (taken as in Figure 12 are viewed) it is possible to employ the comparison pictures, or portions of them in the same manner as above described respecting the mobile grid operation in the X-ray technique. It is thus possible to directly view the stereogram of the unknown terrain and portions of the stereogram of the known terrain and obtain immediately a depth measurement by merely comparing the two. It is also possible to measure the offsets or disparities of points in question on the stereogram of the unknown terrain to determine the height of that point by determining the height of the corresponding part of the known terrain having the same disparity or offset.

What is claimed is:

1. The method of making stereoscopic roentgenograms of a subject of substantial depth which comprises making a roentgenogram with the projector in one position and making a second roentgenogram with the projector laterally displaced therefrom making wash off relief negatives such that one negative is a mirror image of the other, except for the disparity caused by projection shift, polarizing one image in one direction and the other in a direction at right angles thereto and superimposing the polarized images.

2. The process of making a stereo-radiograph of a creature and a tridimensional grid which comprises providing a laterally movable source of penetrative photographable radiation, two sensitized films, all in such spaced relationship as to produce radiographic shadows of the creature and grid on the film, wherein the grid and creature are first juxtaposed relative to one another so that the planes of the grid have known relationship to known reference points in the bone structure, recording on one film the shadows cast by the source when in one position, shifting the position of the source, recording on the other film the shadows cast by the source when in the other position, preparing wash-off relief negatives of each recording one being a mirror image of the corresponding shadow, superimposing the relief negatives, and preparing a print of each negative superimposed on a transparent medium with each print polarized at substantially 90° to the angle of polarization of the other.

EDWARD KLEIN.
MILTON KLEIN.

(References on following page)

REFERENCES CITED

The following references are of record in the file of this patent:

UNITED STATES PATENTS

| Number | Name | Date |
|---|---|---|
| 581,540 | Dennis | Apr. 27, 1897 |
| 583,956 | Thomson | June 8, 1897 |
| 1,370,640 | Granger | Mar. 8, 1921 |
| 1,447,399 | Pease | Mar. 6, 1923 |
| 1,904,868 | Kurtz | Apr. 18, 1933 |
| 2,029,300 | Arfsten | Feb. 4, 1936 |
| 2,057,325 | Bouwers | Oct. 13, 1936 |
| 2,088,041 | Smith | July 27, 1937 |
| 2,141,857 | Gamble | Dec. 27, 1938 |
| 2,194,990 | Torpin | Mar. 26, 1940 |
| 2,196,904 | Sherman | Apr. 9, 1940 |
| 2,203,687 | Land | June 11, 1940 |
| 2,315,373 | Land | Mar. 30, 1943 |
| 2,331,225 | Powers | Oct. 5, 1943 |
| 2,346,774 | Mahler | Apr. 18, 1944 |

FOREIGN PATENTS

| Number | Country | Date |
|---|---|---|
| 789,789 | France | Nov. 6, 1935 |

OTHER REFERENCES

The American Journal of Roentgenology and Radium Therapy, vol. XXXVI, #5, Nov. 1936, pp. 575–587.